No. 723,266. PATENTED MAR. 24, 1903.
F. B. GIESLER.
MALTING APPARATUS.
APPLICATION FILED APR. 14, 1902.
NO MODEL. 4 SHEETS—SHEET 1.

Witnesses
Geo. W. Young,
N. E. Oliphant

Inventor
F. B. Giesler
By H. G. Underwood
Attorney

No. 723,266. PATENTED MAR. 24, 1903.
F. B. GIESLER.
MALTING APPARATUS.
APPLICATION FILED APR. 14, 1902.
NO MODEL. 4 SHEETS—SHEET 2.

Witnesses
Geo. W. Young,
N. E. Oliphant

Inventor
F. B. Giesler
By H. G. Underwood
Attorneys

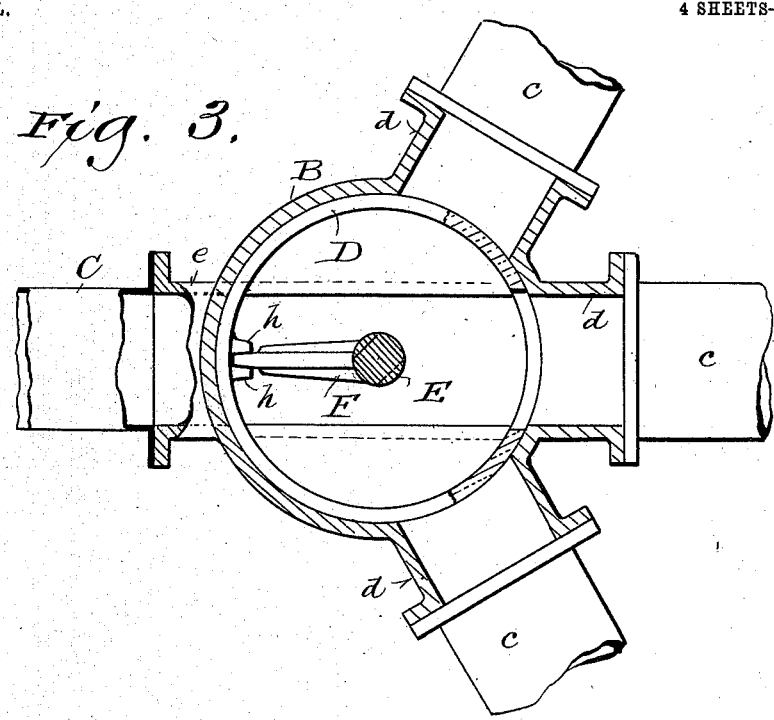
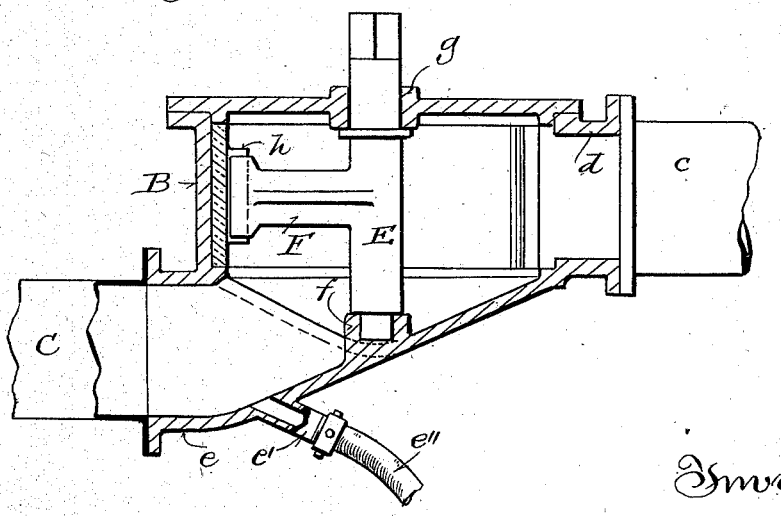

No. 723,266. PATENTED MAR. 24, 1903.
F. B. GIESLER.
MALTING APPARATUS.
APPLICATION FILED APR. 14, 1902.
NO MODEL. 4 SHEETS—SHEET 4.
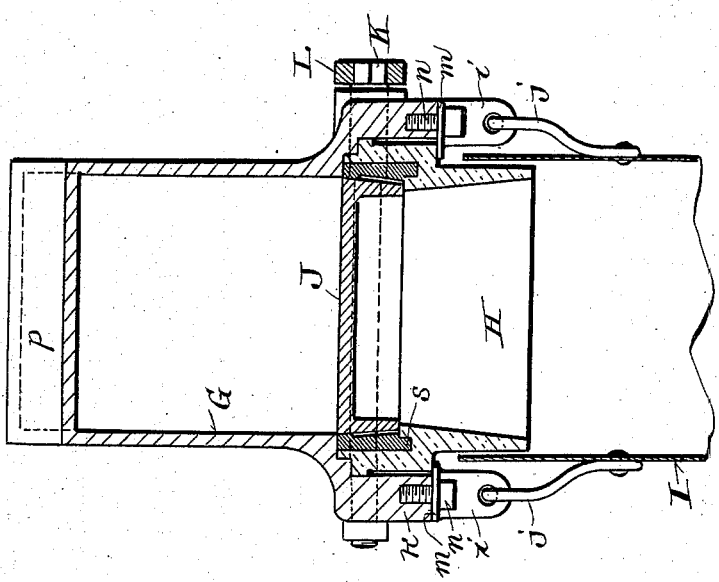
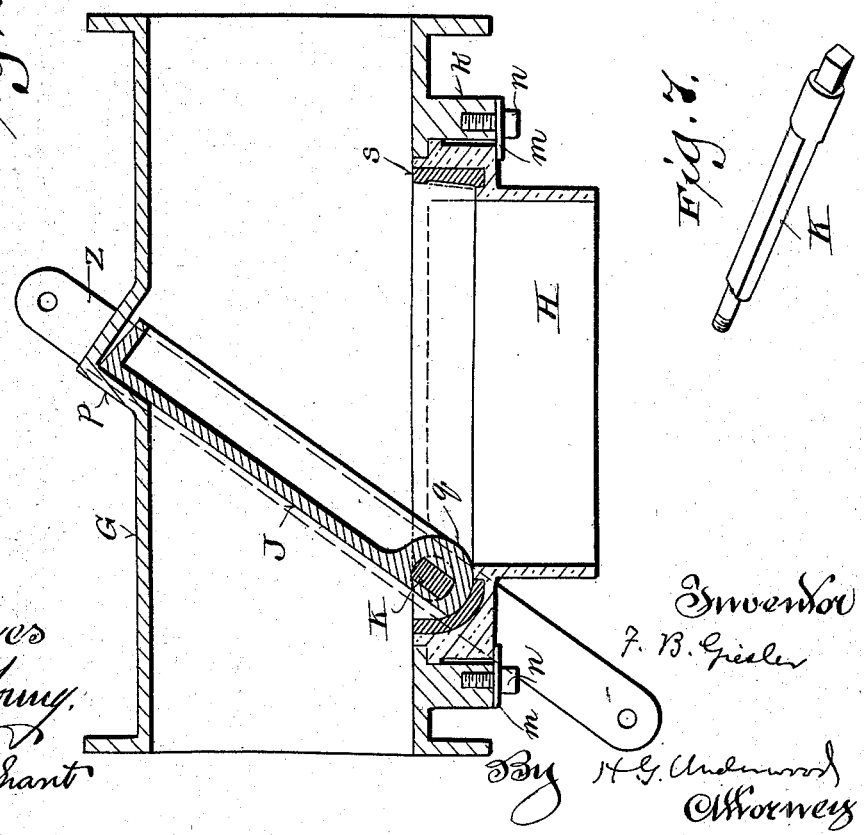

UNITED STATES PATENT OFFICE.

FRANKLIN B. GIESLER, OF MILWAUKEE, WISCONSIN.

MALTING APPARATUS.

SPECIFICATION forming part of Letters Patent No. 723,266, dated March 24, 1903.

Application filed April 14, 1902. Serial No. 102,821. (No model.)

*To all whom it may concern:*

Be it known that I, FRANKLIN B. GIESLER, a citizen of the United States, and a resident of Milwaukee, in the county of Milwaukee and State of Wisconsin, have invented certain new and useful Improvements in Malting Apparatus; and I do hereby declare that the following is a full, clear, and exact description thereof.

The improvements consist in peculiarities of construction and combination of parts hereinafter particularly set forth with reference to the accompanying drawings and subsequently claimed, the object of the invention being to facilitate distribution of grain from steep-tanks to malting-drums and to properly drain the grain run into a drum.

Figure 1:
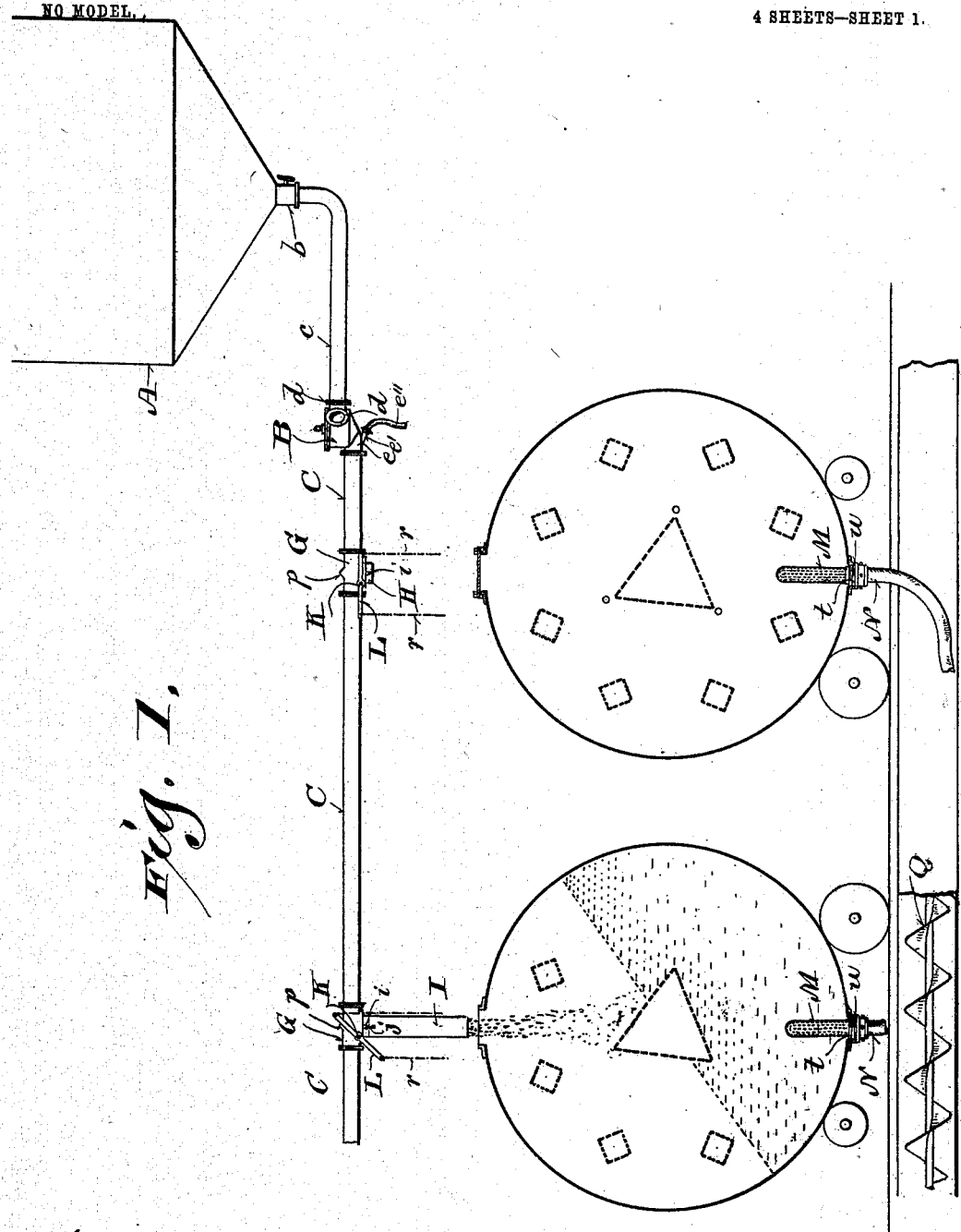
Figure 2:
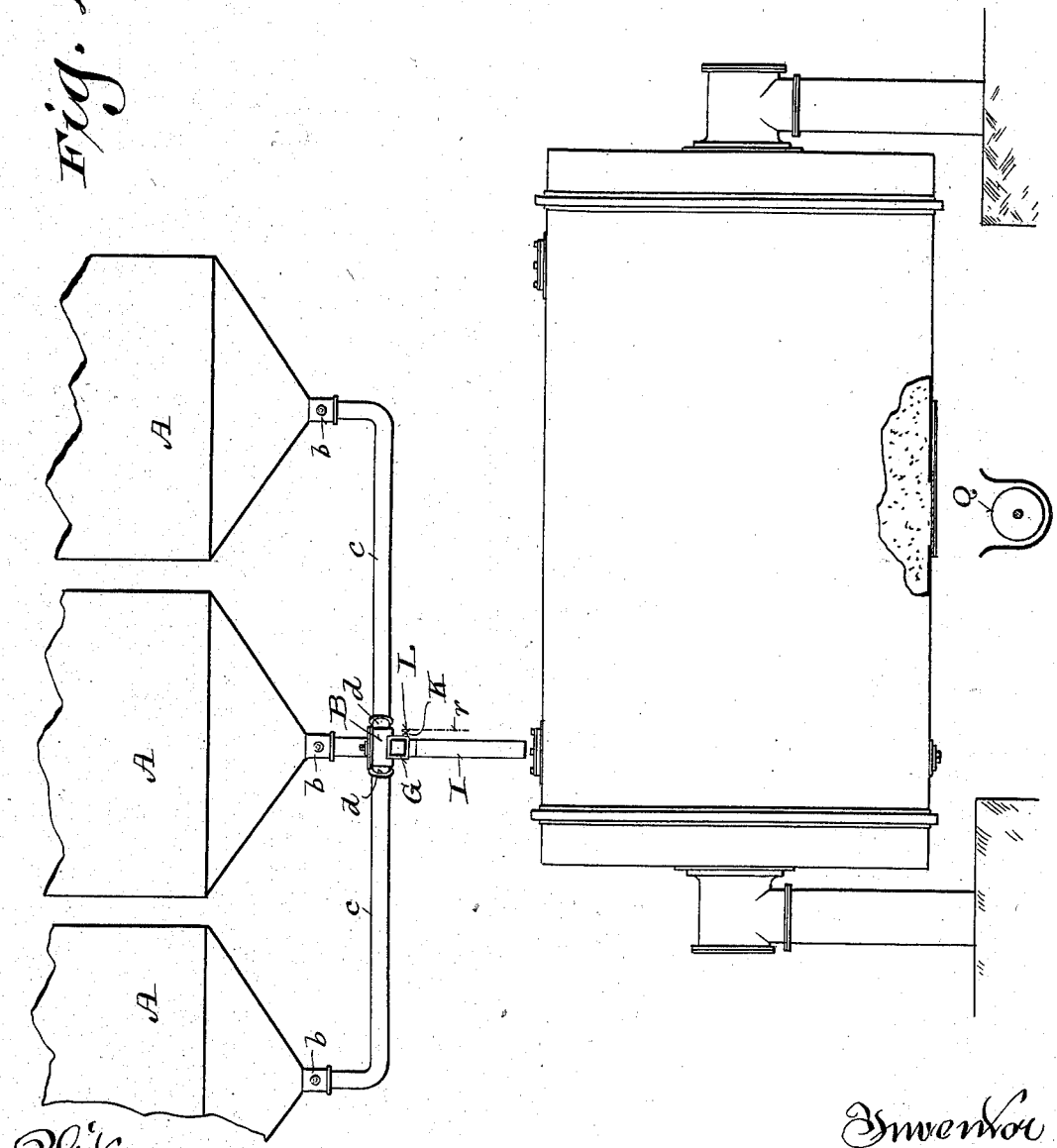

Figures 1 and 2 of the drawings are diagrams that illustrate an application of my improvements. Figs. 3 and 4 respectively represent horizontal and vertical sectional views of a coupling for lower outlet-pipes of a group of steep-tanks, a rotary adjustable cut-off being arranged in the coupling. Figs. 5 and 6 respectively represent longitudinal and transverse section views of a portion of a grain-conduit leading from the steep-tank coupling, this portion of the conduit being provided with a detachable nozzle and cut-off for same, part of a removable delivery-spout being shown in the sixth figure engaged by the nozzle; and Fig. 7 represents a side elevation of a cut-off pivot-pin.

Referring by letter to the drawings, A indicates each of a group of three elevated steep-tanks, and leading from the valve-controlled lower nozzle *b* of each tank is a pipe *c*, each pipe being in connection with a separate inlet branch *d* of a horizontal annular casing B, having a single offset outlet branch *e* in connection with one of the sections C of an overhead conduit. Casing B contains an annular single-port cut-off D for its inlet branches. A stem E is stepped in a socket *f* in the casing, and the removable cover of said casing is provided with a central bearing *g* for the stem. A radial arm F of the stem has its outer end between parallel inner ribs *h* of cut-off D, and rotary adjustment of said cut-off is had by turning said stem. Outlet branch *e* of casing B is shown provided with a nozzle *e'*, to which a water-conveyer *e''* is coupled.

Sections G of the overhead conduit for steeped grain have depending nozzles H, and apertured ears *i* of each of said conduit-sections serve as hangers with which to engage hooks *j* of a delivery-spout I, as is shown in Fig. 6. Each nozzle is preferably a detachable portion of the corresponding conduit-section, supported within a depending flange *k* of same. As a matter of detail each detachable nozzle has match fit in the flange *k* of the corresponding conduit-section and is supported by plates *m*, held in pivotally-adjusted connection with said flange by set-bolts *n*, the inner ends of the plates being under an outer shoulder of the nozzle.

A cut-off J is provided for each nozzle H and arranged to be swung up in the corresponding conduit-section and dam the same forward of said nozzle, there being an upper angular enlargement *p* of said conduit-section, in which the cut-off has clearance, as is best shown in Fig. 5.

As a matter of detail an end swell *q* of each cut-off J is engaged by a central angular portion of a pivot-pin K, journaled in the corresponding nozzle and adjacent conduit-section flange, one of the journals being outwardly extended and made fast in a cross-arm L, that is operated by depending end pulls *r* to adjust said cut-off. It is necessary that each cut-off J have snug fit in the corresponding nozzle. Hence this nozzle is provided with a bushing *s*, in which said cut-off has accurate taper fit. The bushing is preferably soft metal poured in space provided for same in the nozzle, the cut-off being seated in said nozzle. Its pivot-pin K being withdrawn and plates *m* swung out of the way a nozzle H and its cut-off may be readily removed from the corresponding conduit-section.

The conduit-nozzles are preferably flared upon the interior, their area being gradually increased in a downward direction to facilitate discharge of steeped grain, and each nozzle is arranged to be over a malting-drum. In practice when a drum is to be charged with steeped grain its main opening is brought into register with the delivery-spout I, hung from a conduit-section G to surround the nozzle of same, the cut-off pertaining to this nozzle being lifted to dam the conduit beyond and permit flow of the steeped grain with water to said drum. The grain may be taken from any one of the steep-tanks in the group aforesaid, there being proper adjustment of cut-off D in casing B to permit escape through the casing branch in pipe connection with said tank, an illustration of adjustment of said cut-off to permit a flow of steeped grain being shown in Figs. 3 and 4.

Water sufficient to carry all the steeped grain to a drum is let into conduit C through nozzle $e'$ of casing B, and to drain the water from the grain in the drum a vertical strainer M is employed, this strainer being provided with a screw-threaded collar $t$, that engages a tapped fitting $u$, connected to said drum in register with an opening of the same on a plane diametrically opposite the main opening, a screw-plug being ordinarily employed to close the drain-opening. A hose N is shown coupled to strainer-collar $t$ to lead off the water that drains from the drum. The steeped grain in the drum having been drained, the hose is detached from the strainer and said drum turned, after closing its main opening, to bring said strainer above said grain, so that it may be removed and the opening for same in the aforesaid drum plugged, or the strainer may be capped and left in place.

The conveyer Q herein shown is for carrying off green malt discharged from a drum on completion of a germinating process therein.

Having thus described my invention, what I claim as new, and desire to secure by Letters Patent, is—

1. A group of steep-tanks, a conduit having outlets at intervals thereof over malting-drums, a casing having a single outlet coupled to the conduit but provided with a plurality of inlets each in connection with the outlet of one of the steep-tanks, a cut-off adjustable in the casing to establish passage between any one of the inlets and the outlet of same, and other cut-offs arranged to normally close the conduit-outlets but which are independently adjustable to open the adjacent outlet and dam said conduit beyond same.

2. A group of steep-tanks, a conduit having outlets at intervals thereof over malting-drums, a casing having a single outlet coupled to the conduit but provided with a plurality of inlets each in connection with the outlet of one of the steep-tanks, a cut-off adjustable in the casing to establish passage between any one of the inlets and the outlet of same, other cut-offs arranged to normally close the conduit-outlets but which are independently adjustable to open the adjacent outlet and dam said conduit beyond same, a strainer having detachable connection with a drum open to a flow of steeped grain from the aforesaid conduit, and a water-conductor attachable to the strainer.

3. A group of steep-tanks, a conduit having outlets at intervals thereof over malting-drums, cut-offs for these outlets, a casing having a single outlet coupled to the conduit but provided with a plurality of inlets each in connection with the outlet of one of the steep-tanks, a cut-off in the casing, a stem stepped in said casing and engaging a bearing with which the casing-top is provided, and a radial stem-arm in connection with the cut-off, rotary adjustment of said cut-off serving to establish passage between any one of the inlets and the outlet of the aforesaid casing.

4. A conduit having outlets at intervals thereof, a malting-drum under each outlet, cut-offs arranged to normally close the outlets but which are independently adjustable to open the adjacent outlet and dam the conduit beyond same, a delivery-spout, and means for suspending the same in register with any one of conduit-outlets to discharge into the malting-drum thereunder.

5. A conduit having a plurality of detachable outlet-nozzles at intervals thereof, a malting-drum under each nozzle, and detachable cut-offs arranged to normally close the nozzles but which are independently adjustable to open the adjacent nozzle and dam the conduit beyond same.

6. A conduit having sections thereof provided with independent flanges, nozzles having match fit within the flanges, plates held by set-bolts in pivotally-adjustable connection with said flanges to extend under nozzle-shoulders, cut-offs having pivot-pins journaled in the nozzles and conduit-flanges, soft-metal cut-off bushings in said nozzles, adjustment of any one of said cut-offs serving to open the adjacent nozzle, and a malting-drum under each nozzle.

7. A group of steep-tanks, a conduit having outlets at intervals thereof over malting-drums, a casing having a single outlet coupled to the conduit but provided with a plurality of inlets each in connection with the outlet of one of the steep-tanks, a cut-off adjustable in the casing to establish passage between any one of the inlets and the outlet of same, a nozzle constituting part of said outlet attachable to a water-conveyer, and other cut-offs arranged to normally close the conduit-outlets but which are independently adjustable to open the adjacent outlet and dam said conduit beyond same.

In testimony that I claim the foregoing I have hereunto set my hand, at Milwaukee, in the county of Milwaukee and State of Wisconsin, in the presence of two witnesses.

FRANKLIN B. GIESLER.

Witnesses:
N. E. OLIPHANT,
B. C. ROLOFF.